United States Patent [19]

Schulze et al.

[11] Patent Number: 4,681,807

[45] Date of Patent: Jul. 21, 1987

[54] GRAY BODY COLORED ZINC SULFIDE ACTIVATED WITH COPPER

[75] Inventors: Harry O. Schulze, Wyalusing; Ronald E. Karam, Towanda, both of Pa.

[73] Assignee: GTE Products Corp., Danvers, Mass.

[21] Appl. No.: 753,099

[22] Filed: Jul. 9, 1985

[51] Int. Cl.$^4$ .............................................. B32B 9/00
[52] U.S. Cl. .................................. 428/403; 428/690; 252/301.6 S; 106/302; 106/304; 106/308 B; 106/293
[58] Field of Search .................. 252/301.4 R, 301.4 S, 252/301.4 P, 301.6 R, 301.6 P, 301.6 S, 700; 428/403, 690; 106/302, 304, 308 B, 293

[56] References Cited

U.S. PATENT DOCUMENTS

| | | | |
|---|---|---|---|
| 3,522,071 | 8/1966 | Yokota et al. | 252/301.6 S |
| 3,657,142 | 4/1972 | Poss | 252/301.6 S |
| 3,875,449 | 4/1975 | Byler et al. | 252/301.6 S |
| 4,103,069 | 7/1978 | Schulze et al. | 252/301.6 S |
| 4,208,461 | 5/1980 | Vanderpool | 252/301.6 S |
| 4,544,605 | 10/1985 | Miazaki et al. | 428/403 |

*Primary Examiner*—John Doll
*Assistant Examiner*—Robert L. Stoll
*Attorney, Agent, or Firm*—Donald R. Castle

[57] ABSTRACT

A catholuminescent material consisting essentially of particles of copper-activated zinc sulfide cathodoluminescent phosphor having at least a partial coating of a mixture of a blue pigment of cobalt aluminate and a red pigment of iron oxide wherein the weight ratio of said blue pigment to said red pigment is from about 3.5:1 to about 4.5:1 and the weight percent of said pigments are from about 0.2% to about 2% by weight of catholuminescent phosphor. A process for producing said pigmented phosphor comprises forming the appropriate aqueous slurries by proper pH control and then by the addition of colloidal silica, the pigment is coated onto the phosphor particles.

3 Claims, No Drawings

GRAY BODY COLORED ZINC SULFIDE ACTIVATED WITH COPPER

BACKGROUND OF INVENTION

Phosphors coated with pigments to modify absorptive, reflective or emissive characteristics are well known in the art. In certain applications, the natural brilliant yellowish-green body color of the commonly used copper activated zinc sulfide phosphor is objectionable. Even when a neutral density type glass is used in the face plate, a greenish color still persists. For some display applications a gray or neutral color on the unlit screen is preferred. The traditional pigments used on the above mentioned phosphors are a black pigment such as graphite or a blue pigment such as cobalt aluminate. These pigments are added to the phosphor surface to reduce the amount of ambient room light which is reflected toward the viewer from the phosphor particles on the CRT faceplate. When graphite is applied as a coating to the copper activated zinc sulfide phosphor, the resulting body color is a greenish-gray color which can be quite objectionable. This can be overcome by applying a high coating weight, i.e. 1% of graphite, but this causes a severe loss in light output and efficiency.

SUMMARY OF THE INVENTION

In accordance with one aspect of this invention there is provided a catholuminescent material consisting essentially of particles of copper-activated zinc sulfide catholuminescent phosphor having at least a partial coating of a mixture of a blue pigment of cobalt aluminate and a red pigment of iron oxide wherein the weight ratio of the blue pigment to the red pigment is from about 3.5:1 to about 4.5:1 and the weight percent of the pigments are from about 0.2% to about 2% by weight of cathodoluminescent phosphor.

In accordance with another aspect of this invention the process provided for pigmenting the copper activated zinc sulfide phosphor. That process that comprises forming a first aqueous slurry consisting essentially of a copper-activated zinc sulfide cathodoluminescent phosphor and water, forming a second aqueous slurry consisting essentially of a mixture of cobalt aluminate, ferric oxide and water in the ratio of cobalt aluminate to ferric oxide from about 3.5:1 to about 4.5:1, combining these two aqueous slurries to form a third slurry, adjusting the pH of the third slurry in the range of from about 5 to about 6 and thereafter adding collodial silica to the third slurry and adjusting the pH from about 8 to about 9. After about 30 minutes the resulting pigmented phosphor is removed from the aqueous phase and thereafter the pigmented phosphor is dried in an air atmosphere from about 120° C. to about 160° C. for sufficient time to remove the residual water.

DETAILS OF THE PREFERRED EMBODIMENTS

White body or gray body colored phosphors are preferred in certain applications to enhance or improve absorptive and reflective characteristics of the cathode ray tube display. This invention relates to producing such a phosphor by utilizing a red and blue pigment in combination with the natural yellowish-green body color of the phosphor. There has been found that a phosphor with a desired absorptive reflective characteristics can be produced with a minimum loss of brightness by applying a combination of red and blue pigments in the ratio of 3.5:1 to about 4.5:1 and a ratio of about 4:1 is preferred. The pigments are added to the phosphor on the surface of the phosphor and constitutes from about 0.2% to about 2% by weight of the total phosphor, with from about from 0.3% to about 1% by weight of the total phosphor being the pigment being preferred.

The process for preparing this pigmented phosphor comprises forming a first slurry consisting of essentially of cathodoluminescent copper-activated zinc sulfide phosphor and water. The amount of phosphor is generally around 25% to about 35% by weight of the total slurry with from about 28% to about 32% by weight being preferred. A second slurry is formed which consists essentially of a mixture of the blue pigment of cobalt aluminate such as that supplied by a Harshaw Chemical Company as H7546 and a ferric oxide as a red pigment. A suitable red ferric oxide pigment is sold by Pfizer Chemical Company under the designation, #1299. An aqueous slurry containing about 0.6% by weight of the total slurry of the pigment is suitable, although as much as 1.5% and as little as 0.5% by weight of the pigment in the slurry can be used if desired. The amount of total pigment in relationship of total weight of phosphor is from about 0.2% to about 2% by weight of phosphor with from about 0.3% to about 1% being preferred. Therefore the appropriate ratios of the solids in the two slurries and the amounts of the two slurries should be adjusted in accordance with the foregoing preferred ranges to give the appropriate amount of pigment coating on the phosphor thus in an especially preferred embodiment the ratio of the phosphor to cobalt aluminate to ferric oxide is about 995:4:1. After the two slurries are formed they are mixed together and the pH is adjusted to about 5.6. Thereafter colloidal silica is added to the resulting slurry. Generally, this is in the amount of less than about 1% of the total weight of the slurry. After the colloidal silica is added, the pH is then adjusted to from about 8 to about 9 and the resulting solution is stirred for about 20 to about 45 minutes. The coated or pigmented phosphor is then separated from the aqueous phase. Generally it is merely necessary to let the solids settle from the liquid to form a two phase system and to decant the liquid and then filter the coated phosphor. Thereafter, the coated phosphor is dried in an air atmosphere of about 120° C. to about 160° C. in a conventional oven. If it is desired an additional coating of silica at about 0.2% to about 5% by weight can be applied as an overcoat to improve the bond of pigment retention. If this is done the phosphor is then redried after coating with the aqueous silica solution then it is sieved through an appropriate screen and is then ready for use in making the cathode ray display tubes.

The following detailed example is presented. All parts, proportions and percentages are by weight unless otherwise indicated.

EXAMPLE 1. 300 parts of copper-activated zinc sulfide phosphor are added to 1000 parts of deionized water.

2. About 0.196 parts of Harwhaw Type H7546 CoAl$_2$O$_4$ blue pigment and about 0.24 parts of #1299 Pfizer red Fe$_2$O$_3$ pigment are milled with about 200 parts of H$_2$O.

3. The milled pigment slurry is added to the phosphor slurry.

4. The resulting combination is agitated for about ten minutes and the pH is adjusted to about 5.5 with 10% $H_2SO_4$.

5. About 6 parts of Wesol P colloidal silica is added to the combination of step 4.

6. A 10% $NH_4OH$ solution is slowly added and the pH is adjusted to the range of about 8 to about 9.

7. The pH adjusted slurry is agitated for about ½ hour, settled, and the supernatent liquid is decanted and then the coated phosphor is filtered from the remaining liquid.

8. The coated phosphor is dried in an oven at about 120° C. to about 60° C.

While there has been shown and described what are at present considered the preferred embodiments of the invention, it will be obvious to those skilled in the art that various changes and modifications may be made therein with out departing from the scope of the invention as defined by the appended claims.

What is claimed is:

1. A cathodoluminescent material consisting essentially of particles of copper activated zinc sulfide cathodoluminescent phosphor having at least a partial coating of a mixture of a blue pigment of cobalt aluminate and a red pigment of ferric oxide wherein the ratio of said blue pigment to said red pigment is from about 3.5:1 to about 4.5:1 and the weight percent of said pigments are from about 0.2% to about 2% by weight of said phosphor.

2. A material according to claim 1 wherein the ratio of red to blue pigment is about 4:1.

3. A material according to claim 1 wherein the weight percent of said pigments is from about 0.3% to about 1% of said phosphor.

* * * * *